United States Patent [19]
Bodick et al.

[11] 4,094,937
[45] June 13, 1978

[54] CYLINDRICAL MULTI-FAN COUNTERFLOW COOLING TOWER

[75] Inventors: Gaylord E. Bodick; Martin V. Gruber, both of Erie, Pa.

[73] Assignee: Zurn Industries, Inc., Erie, Pa.

[21] Appl. No.: 677,401

[22] Filed: Apr. 15, 1976

[51] Int. Cl.² ............................................. B01F 3/04
[52] U.S. Cl. .................................. 261/111; 261/109; 261/DIG. 11
[58] Field of Search ............... 261/111, 110, DIG. 11, 261/112, 108, 109, DIG. 77, 23 R, 24; 55/276, 435; 165/DIG. 1

[56] References Cited

U.S. PATENT DOCUMENTS

| 1,745,297 | 1/1930 | Harry | 261/DIG. 11 |
|---|---|---|---|
| 2,042,127 | 5/1936 | Sayles | 261/DIG. 11 |
| 2,356,192 | 8/1944 | Yingling | 261/111 X |
| 2,809,818 | 10/1957 | Munters | 261/24 |
| 3,243,166 | 3/1966 | Osenga et al. | 261/DIG. 11 |
| 3,389,895 | 6/1968 | De Flon | 261/111 |
| 3,395,903 | 8/1968 | Norback et al. | 261/DIG. 11 |
| 3,608,873 | 9/1971 | Furlong | 261/DIG. 11 |
| 3,617,036 | 11/1971 | Brown | 261/111 |
| 3,743,257 | 7/1973 | Fordyce | 261/112 |
| 3,851,726 | 12/1974 | Grose | 55/276 X |
| 3,870,485 | 3/1975 | Shiraishi et al. | 261/DIG. 11 |

FOREIGN PATENT DOCUMENTS

| 46,428 | 5/1917 | Sweden | 261/DIG. 11 |
|---|---|---|---|
| 704,965 | 3/1954 | United Kingdom | 261/DIG. 11 |
| 708,310 | 5/1954 | United Kingdom | 261/DIG. 11 |
| 998,822 | 7/1965 | United Kingdom | 261/DIG. 11 |
| 1,020,079 | 2/1966 | United Kingdom | 261/DIG. 11 |

*Primary Examiner*—Tim R. Miles
*Assistant Examiner*—Richard L. Chiesa
*Attorney, Agent, or Firm*—Charles L. Lovercheck

[57] ABSTRACT

A cylindrical counterflow, multi-fan cooling tower is disclosed having a cylindrical cold water basin and a cylindrical shell spaced above the basin. A deck is supported above the shell and a plenum chamber is defined within the shell between the deck and fill system. Water from a distribution system in the plenum chamber above the fill distributes water which flows down over the fill in counterflow relation to the air drawn up through the fill. Fans on the deck draw air through the space between the cold water basin and the shell through the fill system and plenum chamber and discharge it in the form of a high rising column of hot, moist air.

11 Claims, 22 Drawing Figures

CYLINDRICAL MULTI-FAN COUNTERFLOW COOLING TOWER

GENERAL STATEMENT OF THE INVENTION

It is an object of the present invention to provide a cylindrical, counterflow, multi-fan, mechanical draft cooling tower which has a lesser tendency to draw warm, moist air back through the cooling tower than a conventional non-circular counterflow tower.

It is known that the efficiency of operation of rectangular-shaped mechanical draft, multi-fan cooling towers is reduced when a strong wind blows across the tower. The hot, moist air being discharged from the fan shrouds tends to be drawn down to a lower level along the cooling tower air inlet opening on the leeward side of the tower. This results in hot, moist air being drawn back onto the tower, thus reducing the cooling efficiency of the tower.

Applicant has discovered that by making the counterflow cooling tower of a cylindrical configuration instead of the usual rectangular configuration, the effects of wind blowing across the tower can be reduced and the efficiency of the tower improved thereby.

REFERENCE TO PRIOR ART

U.S. Pat. No. 3,743,257 discloses a circular cross flow cooling tower with various configurations of fill system.

U.S. Pat. No. 3,243,166 discloses a circular cross flow cooling tower.

The inventors know of no prior art showing a cylindrical multi-fan counterflow cooling tower.

OBJECTS OF THE INVENTION

It is an object of the invention to provide an improved cylindrical counterflow cooling tower.

Another object of the invention is to provide a cooling tower that is simple in construction, economical to manufacture and simple and efficient to build.

With the above and other objects in view, the present invention consists of the combination and arrangment of parts hereinafter more fully described, illustrated in the acompanying drawings and more particularly pointed out in the appended claims, it being understood that changes may be made in the form, size, proportions and minor details of construction without departing from the spirit or sacrificing any of the advantages of the invention.

GENERAL DESCRIPTION OF THE DRAWINGS

FIG. 15 is a cross sectional view taken on line 15—15 of FIG. 14.

DETAILED DESCRIPTION OF THE DRAWINGS

Now, with more particular reference to the drawings, the cooling tower 10 is made up generally of the basin 11 and cylindrical shell 12 which is closed at its upper end by roof deck 13 and supported in spaced relation to basin 11 by frame 14. A fill pack 19 is supported by frame 14 in the shell 12 above and in spaced relation to the cylindrical basin 11 and water to be cooled is sprayed from a water distribution system onto the fill pack and, as the water flows down through the fill pack in contact with the upwardly flowing air, some water evaporates and cools the remaining water as it continues to flow to the cylindrical cooling basin 11. The cylindrical shell 12 and roof deck 13 may both be made of reinforced concrete of approximately the same diameter as the cold water basin 11. Material other than reinforced concrete can obviously be used, e.g., fabricated steel or any other suitable material.

The roof deck 13 may also be made of reinforced concrete in the form of a slab and the outer periphery of the roof deck 13 is supported on the top of the shell 12 and intermediate parts thereof are supported on the columns 20. The roof deck 13 is surrounded by a handrail 64, and has fan holes 16 formed in it and the shrouds 18 are supported around the fan holes 16 on the deck 13. The fans 17 are supported in the opening 16 on the deck 13.

The shoulders on the ends of fill pack sheets 21 of fill pack 19 are supported below the deck 13 on beams 40 which are, in turn, supported on the columns 20 and 31 in spaced relation to the roof deck 13 providing a plenum chamber 34 therebetween.

The fill pack 19 is made up of lower sheets 21 and upper sheets 50. The lower sheets 21 have shoulders at each end that rest on the beams 40. The upper sheets 50 are rectangular sheets supported in vertical relation and at right angles to the lower sheets 21. The upper sheets 50 are generally rectangular in shape and are held in spaced relation to each other by suitable spacers 48.

The lower sheets 21 are likewise generally rectangular in shape and they have elongated openings 45, grooves 44 and holes 43 in them. The holes 43 receive spacers 48 that extend through holes 43 and down along the sides of the fill sheets 21 and hold them in spaced relation. The lower edges of the sheets 21 have scollups 42 formed therein that help to channel the water and cause it to regroup as it flows downward. Both fill pack sheets 50 and 21 which make up the pack 19 may be made up of asbestos board or other suitable material. Spacers 48 may have two round heads connected together by an intermediate member and the thickness of the heads determines the spacing of sheets 21.

The basin 11 has a cylindrical wall 55 and a bottom 56 which is supported on a suitable footing. The frame is made up of columns 14 which rest on cylindrical walls 55 of the basin 11 and cylindrical shell 12 rests on the upper ends of the columns 14.

The spaced columns 20, 31 and 31' rest on the bottom 56 of the basin 11. The intermediate parts of the deck 13 rest on the upper ends of columns 20, flumes 23 rest on the upper ends of columns 31', while the lateral members 40 are supported on columns 20, 31 and 31' and spaced below the flumes 23.

Several embodiments of the fill are disclosed. An embodiment of the fill is shown in FIGS. 1 through 9 and 12 through 14. Other embodiments are shown in FIGS. 16, 17, 18, 19, 20, 21, 22, 23 and 24.

The embodiment of fill shown in FIGS. 12 through 15 are like those in FIGS. 1 through 9 except the upper sheets 50 are arranged parallel to sheets 21 and held in place by combs 49.

Figure 1:
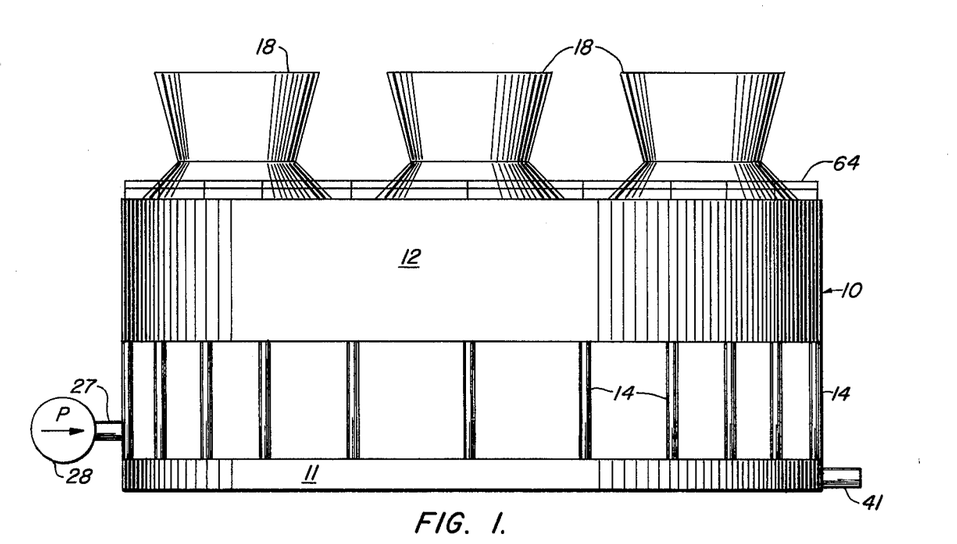
FIG. 1 is a side view of the cooling tower according to the invention.
Figure 2:
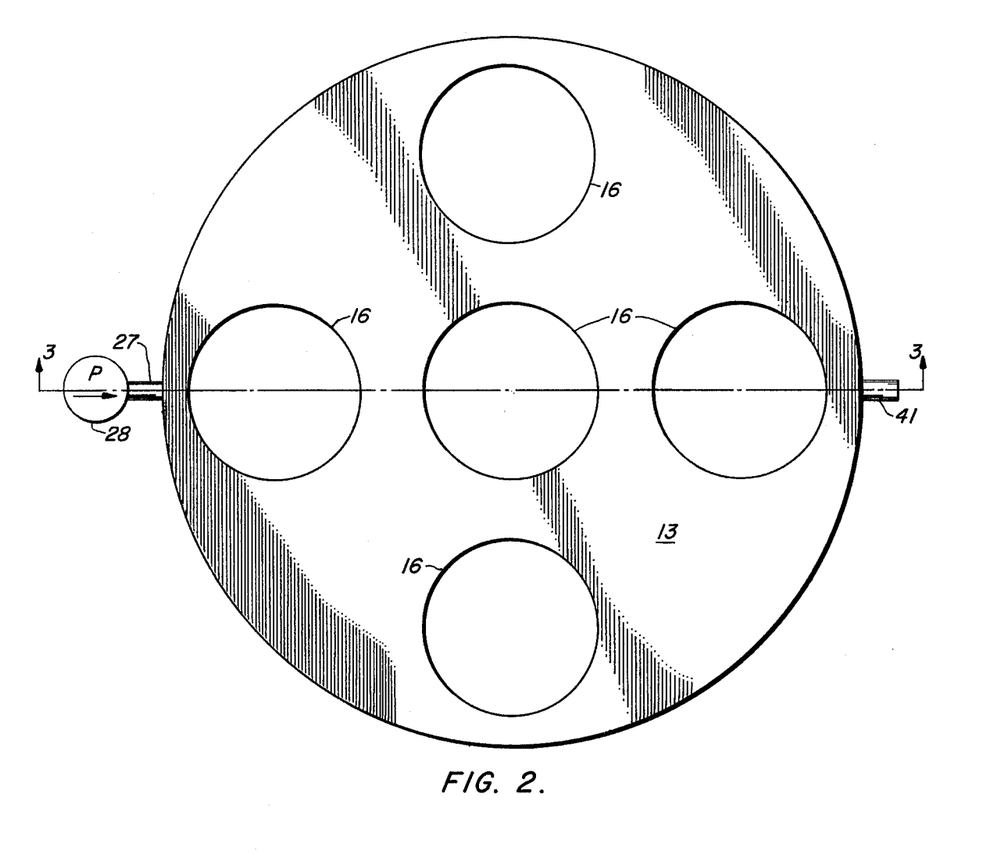
FIG. 2 is a top view of the cooling tower with the fan shrouds removed.
Figure 3:
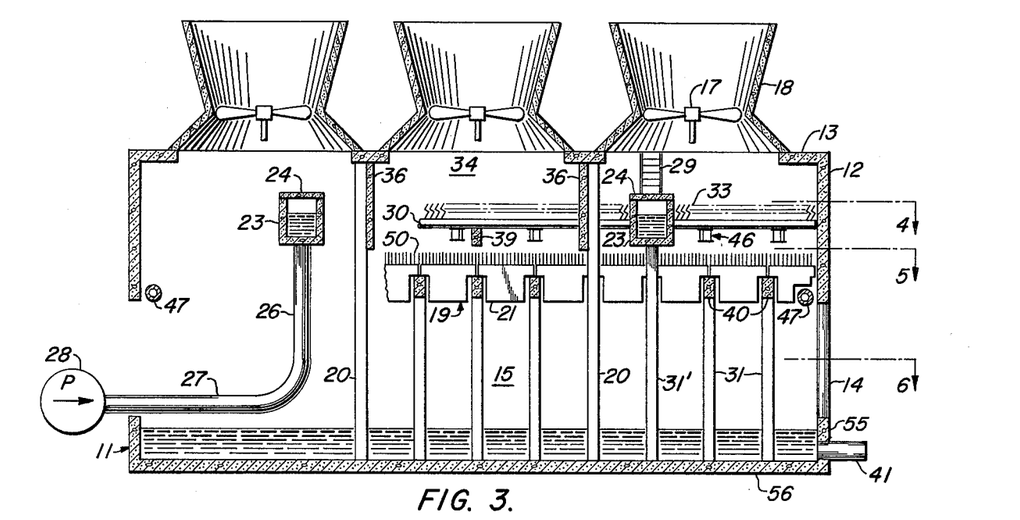
FIG. 3 is a longitudinal cross sectional view of the cooling tower according to the invention.
Figure 4:
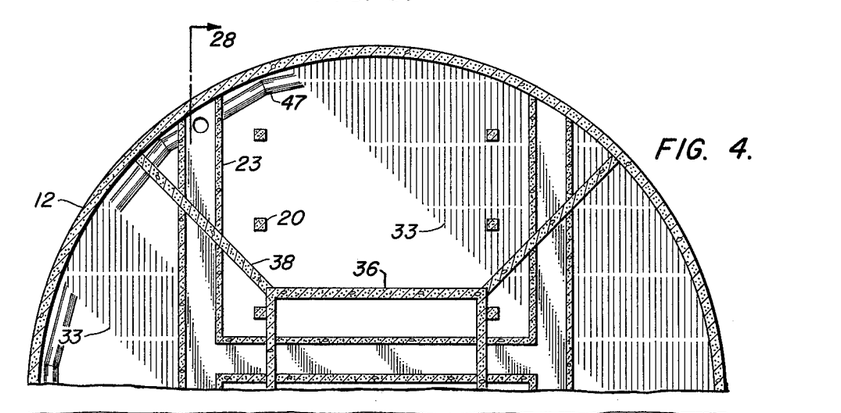
FIG. 4 is a partial cross sectional view taken on line 4—4 of FIG. 3.
Figure 5:
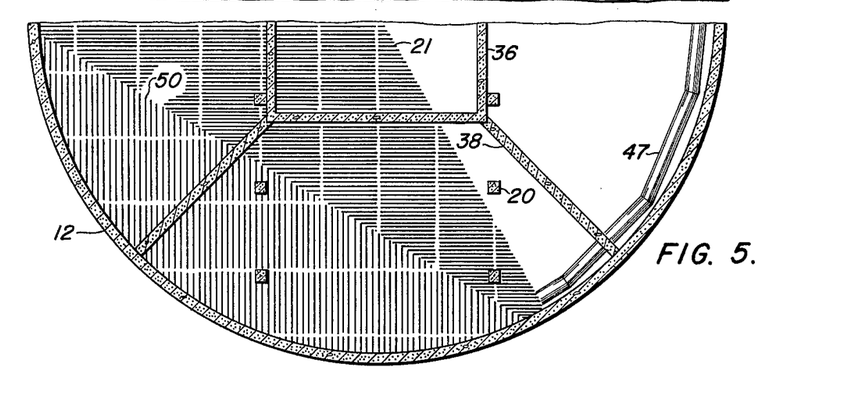
FIG. 5 is a partial cross sectional view taken on line 5—5 of FIG. 3.
Figure 6:
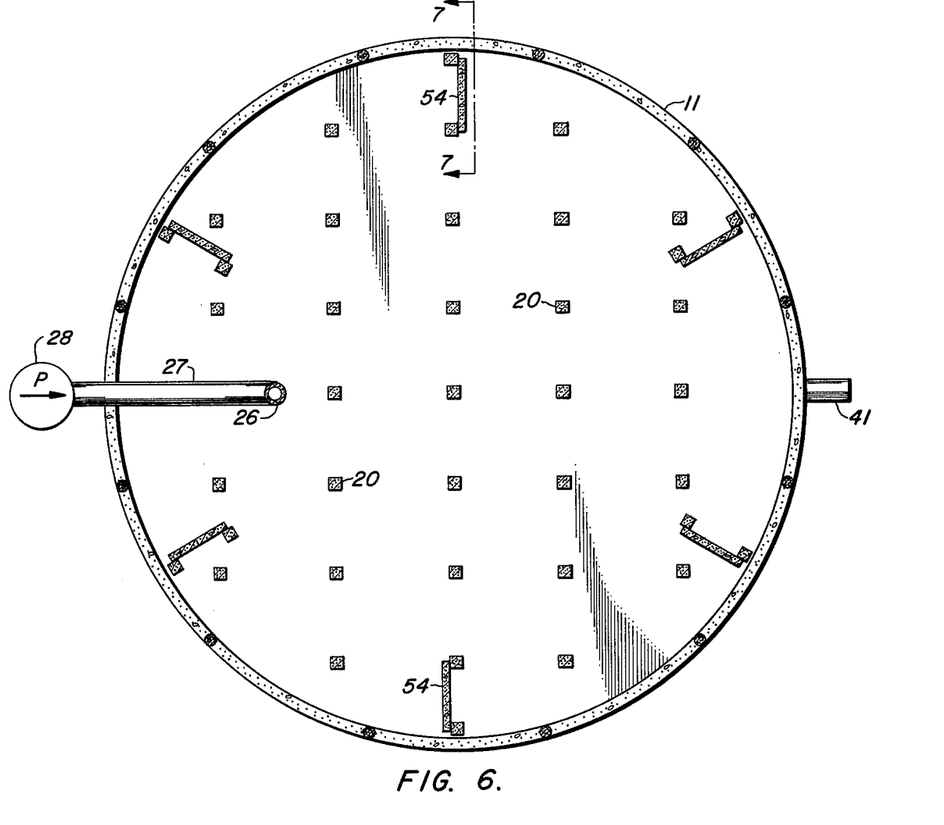
FIG. 6 is a cross sectional view taken on line 6—6 of FIG. 3.
Figure 7:
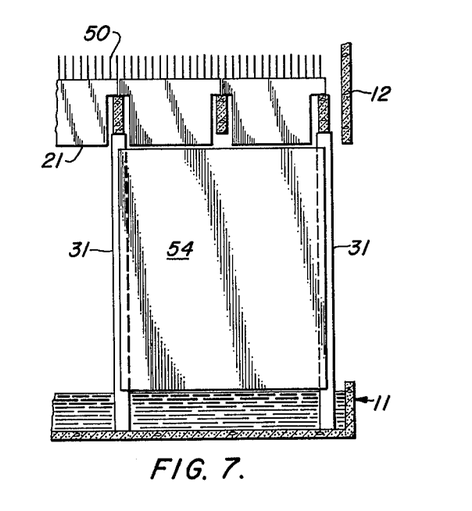
FIG. 7 is a partial cross sectional view taken on line 7—7 of FIG. 6.
Figure 8:
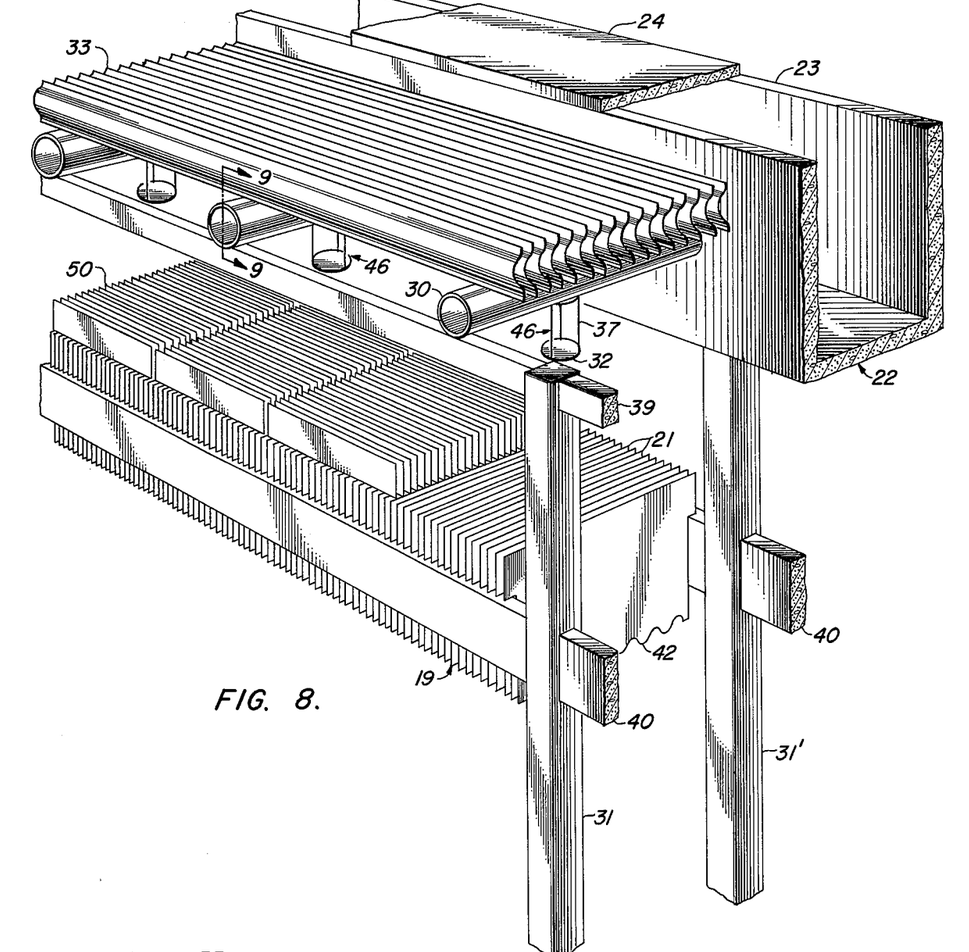
FIG. 8 is an enlarged partial perspective view of a part of the cooling tower.
Figure 9:
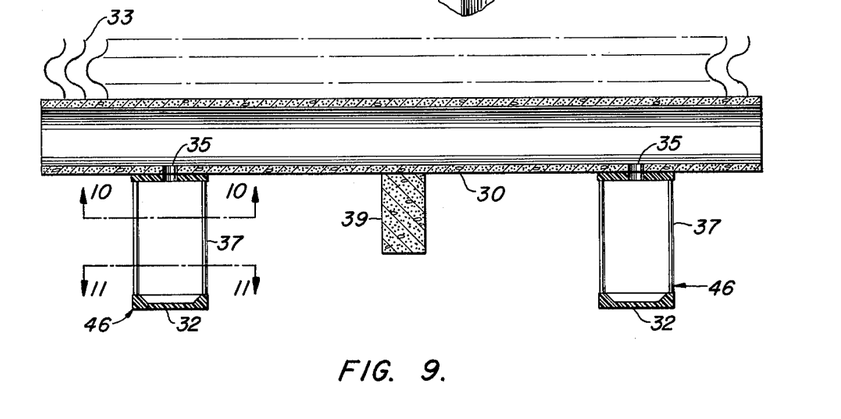
FIG. 9 is a cross sectional view taken on line 9—9 of FIG. 8.
Figure 10:
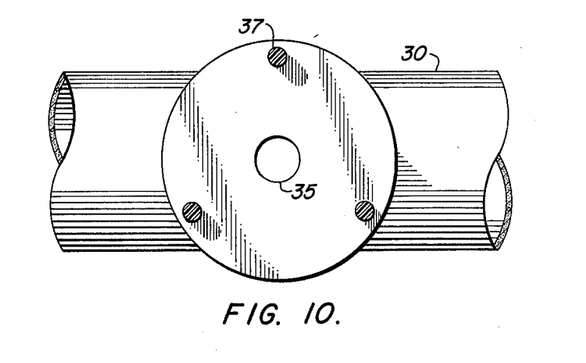
FIG. 10 is a cross sectional view taken on line 10—10 of FIG. 9.
Figure 11:
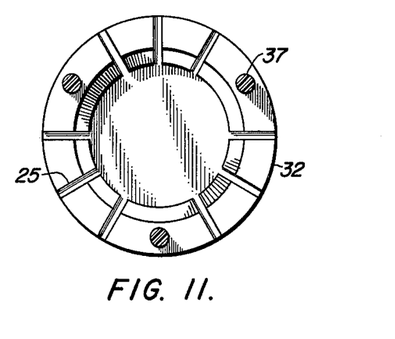
FIG. 11 is a cross sectional view taken on line 11—11 of FIG. 9.
Figure 12:
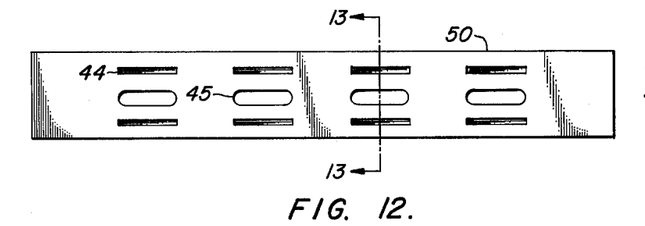
FIG. 12 is an enlarged side view of upper fill sheets.
Figure 13:
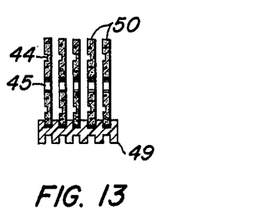
FIG. 13 is a cross sectional view taken on line 13—13 of FIG. 12.
Figure 14:
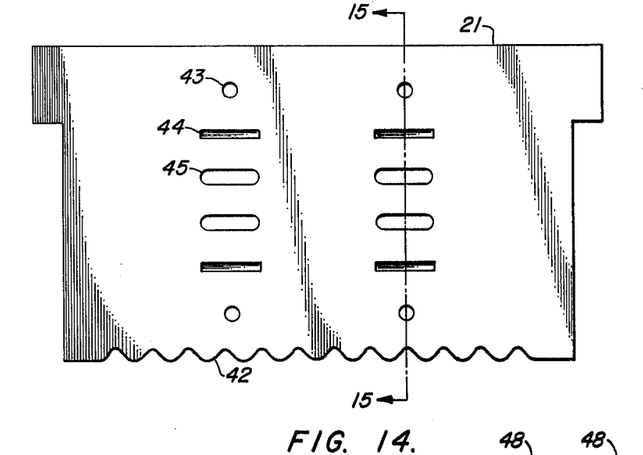
FIG. 14 is an enlarged side view of lower fill sheets.
Figure 16:
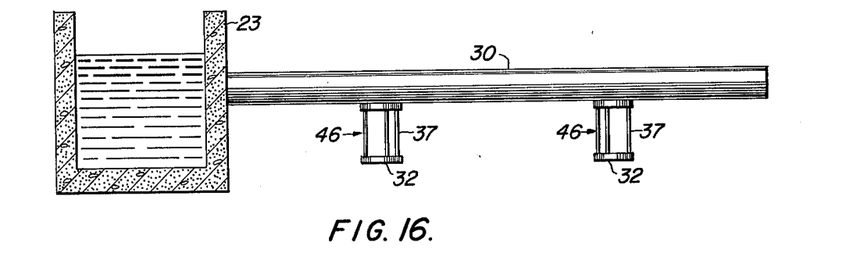
FIG. 16 is a partial view similar to FIG. 9 of an embodiment of open flume distribution.
Figure 17:
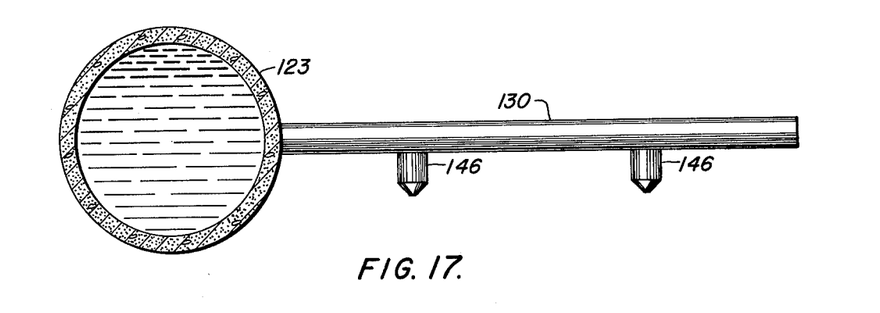
FIG. 17 is a view similar to FIG. 25 of an embodiment of closed flume distribution.

FIG. 17 shows an embodiment of the invention wherein the flumes 123 are in the form of round pipe having the lateral pipe 130 connected to them instead of open-topped flumes as in FIG. 25. This closed system of FIG. 26 can be pressurized. Nozzle 146 sprayswater onto the fill pack.

Figure 18:
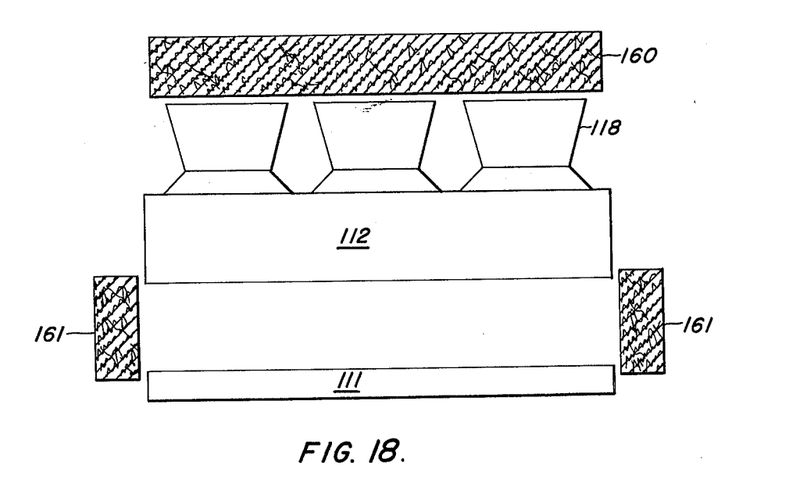
FIG. 18 is a view showing the outline of a cooling tower according to the invention with sound attenuating.

In the embodiment of the invention shown in FIG. 18, a sound-attenuating material 160 such as mineral wool or other sound-attenuating material is supported above the upper ends of the shrouds 118 and sound-attenuating material 161 is supported around the space between the basin 111 and the shell 112.

Figure 19:
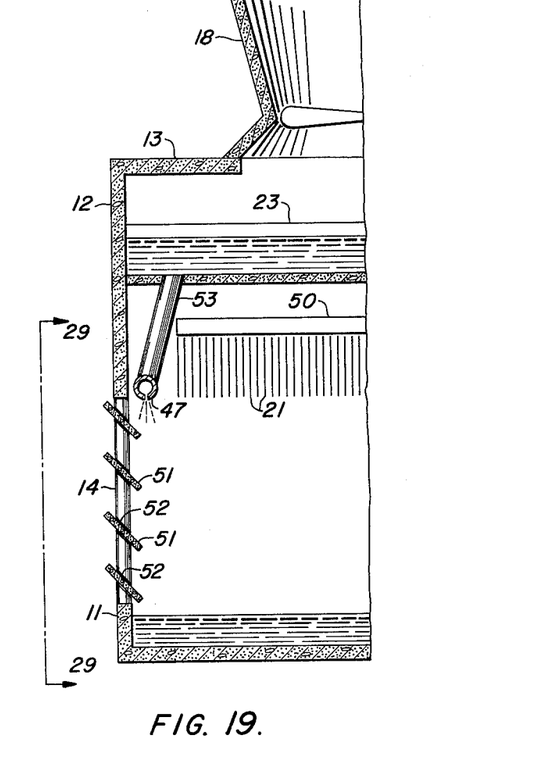
FIG. 19 is a cross sectional view taken on line 28—28 of FIG. 4 of another embodiment of the invention.
Figure 20:
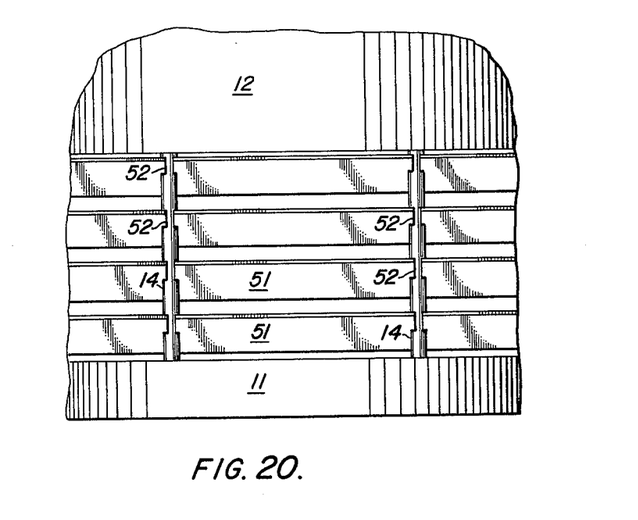
FIG. 20 is a partial side view taken on line 29—29 of FIG. 28.

The embodiment of the invention shown in FIGS. 19 and 20 show louvers 51 in the form of plates inclined, e.g. at 45° to the horizontal that have their ends received in inclined slots 52 in columns 14. These louvers prevent the falling water droplets from escaping from the cooling tower.

Wind walls 54 are sheets of rigid material supported between the basin 11 and the fill pack 19. Wind walls 54 are radially disposed at circumferentially spaced positions. They reduce the velocity of wind blowing through the space between the basin and the shell, thereby reducing the tendency of the wind to carry falling water droplets out of the cooling tower.

Partition walls 36 and 38 are supported in the plenum chamber between the fill pack and the deck. The partition walls extend radially in the example shown but could be arranged in any pattern that would isolate fans or groups of fans from each other, thereby making it possible to shut down certain fans while other fans remain running without allowing the hot, moist discharge air from fans that are running to recirculate through the non-operating fan openings. Thus, the partitions make it practical to operate the fans independently of each other and certain fans in the pattern can be completely shut down while others remain operating. This is particularly advantageous when certain weather conditions prevail, e.g., when cold weather makes it necessary to reduce the flow of air through the tower to prevent the formation of ice. The sound attenuating material 160 and 161 will be supported on suitable structural members of a type familiar to those skilled in the art.

The deicing pipe 47 is supported around the periphery just inside the lower edge of the shell 12 and is connected to the flume 23 by pipe 53. The lower side of the pipe 47 has axially-spaced holes therein and these holes discharge water which forms a curtain in front of the space between the shell 12 and the basin 11 to warm the air that enters through this space, thereby preventing the possible formation of ice on the fill pack.

Figure 21:
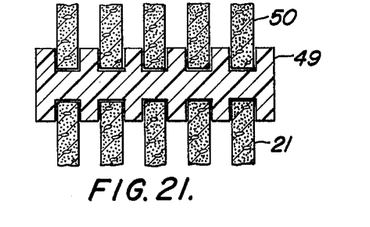
FIG. 21 is a top view of another embodiment of a cooling tower.
Figure 22:
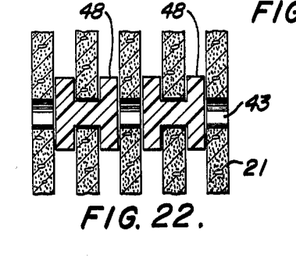
FIG. 22 is an enlarged partial view of FIG. 15.

FIG. 21 shows a top view of a cooling tower with the shrouds removed to show a possible arrangement of fan holes 116 in the deck 113.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A round, counterflow, multi-fan, mechanical draft cooling tower comprising,
    a cylindrical cold water basin,
    a cylindrical shell substantially the same size as said basin, closed at its upper end by a horizontal planar deck,
    means supporting said cylindrical shell over said cold water basin in spaced relation thereto,
    said deck being attached to the upper end of said cylindrical shell,
    spaced columns extending from said deck to said cold water basin supporting said deck at positions spaced inwardly from said cylindrical shell,
    said deck having at least five symmetrically arranged, uniformly spaced openings therein with at least four openings adjacent the periphery of said shell and at least one opening in the center,
    a fan supported in each said opening,
    a fill pack of generally cylindrical configuration having a diameter substantially equal to the inside diameter of said cylindrical shell and positioned below said deck defining a plenum chamber between said deck and said fill pack,
    a drift eliminator in said plenum chamber above and adjacent said fill pack,
    and means below said drift eliminator above said fill pack for distributing water to be cooled generally uniformly over said fill pack,
    said fans being adapted to draw air through said space between said cold water basin and said shell, through said fill pack, and through said drift eliminator,
    whereby some of said water is evaporated and discharged by said fans,
    the remaining portion of said water releases heat to said evaporated water and is thereby cooled and flows to said cold water basin for use as cold water,
    said cylindrical fill pack being supported below said drift eliminator in closely spaced relation to said drift eliminator,
    said drift eliminator being supported below said deck at a distance approximately equal to the diameter of said fans, said fill pack being supported above said cylindrical cold water basin defining a generally cylindrical open space between said fill pack and said basin adapted to contain air at a substantially uniform pressure throughout, whereby the air adjacent the lower side of said fill pack is at a generally uniform pressure, radially-extending partition walls provided in said plenum chamber comprising barriers preventing the recirculation of air inside said plenum chamber and providing a flow passage for air to each said fan whereby said fans operate independently of one another.

2. The cooling tower recited in claim 1 wherein said means to distribute water comprises,
- a plurality of open-topped flumes generally rectangular in cross-section extending diametrically across said cooling tower in said plenum chamber,
- lateral pipes having their ends connecting said flumes connected to the sides of said flumes and extending generally perpendicular thereto,
- said lateral pipes each having a plurality of axially-spaced holes in the bottoms thereof,
- and nozzle means connected to each said hole.

3. The cooling tower recited in claim 2 wherein said nozzle means comprises
- a splash plate supported on said lateral pipes below each said hole in spaced relation to said pipe whereby water flowing from said lateral pipes through said holes impinges on said splash plate and splashes, thereby distributing water generally uniformly over said fill pack in the path of air drawn by said fans laterally into said tower between said cold water basin and said shell and up through said fill pack to said fans, whereby some of said water may trickle downward over said fill pack and is cooled and gravitates into said cold water basin.

4. The cooling tower recited in claim 3 wherein said drift eliminator means comprising spaced, generally vertically-extending plates having concentric curves therein resting on said pipes.

5. The cooling tower recited in claim 1 wherein said fill pack comprises spaced plates disposed in vertical planes and said plates have scollops on their lower edge for facilitating the regrouping of water and directing the water down into the basin.

6. The cooling tower recited in claim 5 wherein said tower has a frame comprises spaced horizontally-extending beams and said plates have a downwardly facing shoulder on each end and said shoulder rests on one of said spaced, horizontally-extending beams.

7. The cooling tower recited in claim 6 wherein second plates are disposed in parallel vertical planes and at right angles to said first mentioned plates.

8. The cooling tower recited in claim 7 wherein means for supporting said splash plates comprise at least three rods attached to said splash plates at the lower end thereof and attached to said pipes at the upper ends thereof.

9. The cooling tower recited in claim 1 wherein radially-extending wind walls are provided in the space between said basin and said fill.

10. The cooling tower recited in claim 9 wherein said windwalls are provided in said space between said basin and said fill and extend from the outer portion of said cooling tower inwardly.

11. The cooling tower recited in claim 1 wherein a pipe is supported on said cooling tower at the lower edge of said cylindrical shell,
- axially-spaced openings in the bottom of said pipe providing means to direct water downwardly around the outer periphery of said shell toward said basin whereby a warm water curtain is provided for warming air entering said cooling tower to prevent the formation of ice.

* * * * *